United States Patent
Schuh

(10) Patent No.: US 7,994,416 B2
(45) Date of Patent: Aug. 9, 2011

(54) SEMI-COMPENSATED PINS FOR COLD JUNCTION COMPENSATION

(75) Inventor: William C Schuh, Delavan, WI (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 969 days.

(21) Appl. No.: 11/037,719

(22) Filed: Jan. 18, 2005

(65) Prior Publication Data

US 2005/0155640 A1   Jul. 21, 2005

Related U.S. Application Data

(62) Division of application No. 10/463,135, filed on Jun. 17, 2003, now Pat. No. 7,084,342.

(51) Int. Cl.
*H01L 35/02* (2006.01)
*H01L 35/04* (2006.01)
*H01L 35/06* (2006.01)

(52) U.S. Cl. ............ 136/230; 136/232; 136/236.1; 136/224; 136/227; 136/235; 374/181; 374/179; 374/208; 439/626; 439/638; 439/641; 439/657; 439/259; 439/913; 439/727

(58) Field of Classification Search ............ 136/230, 136/232, 236.1, 224, 227, 235; 374/181, 374/179, 208; 439/626, 638, 641, 657, 259, 439/913, 727
See application file for complete search history.

(56) References Cited

U.S. PATENT DOCUMENTS

| | | | |
|---|---|---|---|
| 1,468,456 A | 9/1923 | Bristol | |
| 2,466,202 A | 4/1949 | Brenner | |
| 3,501,957 A * | 3/1970 | Jones, Jr. | 374/140 |
| 3,767,470 A | 10/1973 | Hines | |
| 3,911,745 A * | 10/1975 | Erhardt | 374/181 |
| 4,125,738 A | 11/1978 | Nichols | |
| 4,130,019 A | 12/1978 | Nitschke | |
| 4,133,700 A * | 1/1979 | Hollander et al. | 374/181 |
| 4,147,061 A | 4/1979 | Wester et al. | |
| 4,221,923 A | 9/1980 | Nagao et al. | |
| 4,482,261 A | 11/1984 | Dewey et al. | |

(Continued)

FOREIGN PATENT DOCUMENTS

EP   1014059   6/2000

(Continued)

OTHER PUBLICATIONS

"Thermocouple Descriptions", Publication 1790-UM003A-EN-P, No date available, 18 pages.

(Continued)

*Primary Examiner* — Alexa Neckel
*Assistant Examiner* — Golam Mowla
(74) *Attorney, Agent, or Firm* — Brinks Hofer Gilson & Lione

(57) ABSTRACT

A set of electrical connector pins for a thermocouple includes two materially similar conductor pairs, each conductor pair having conductors composed of a different material, and carried by an electrically insulating connector housing. The different materials of the conductor pairs provide a partial compensation to the thermocouple EMF developed between the hot junction and the cold junction when engaged thereto for the different type thermocouples. The conductors of each pair are operable to engage with two thermoelement conductors that form a thermocouple of differing types. The thermocouples provide a hot junction electrical interconnection therebetween at one end and are coupled to a cold junction at another end.

20 Claims, 12 Drawing Sheets

U.S. PATENT DOCUMENTS

| | | | |
|---|---|---|---|
| 4,483,632 A | | 11/1984 | Dewey et al. |
| 4,618,198 A | * | 10/1986 | Dale et al. .................... 439/281 |
| 4,623,266 A | | 11/1986 | Kielb |
| 4,624,582 A | * | 11/1986 | Banda et al. ................. 374/181 |
| 4,718,777 A | * | 1/1988 | Mydynski et al. ............ 374/181 |
| 4,732,619 A | | 3/1988 | Nanigian |
| 4,804,272 A | | 2/1989 | Schmitz |
| 4,834,677 A | * | 5/1989 | Archang ....................... 439/660 |
| 4,936,690 A | | 6/1990 | Goetzinger |
| 5,038,303 A | | 8/1991 | Kimura |
| 5,090,918 A | * | 2/1992 | Zoellick et al. ............... 439/487 |
| 5,161,893 A | | 11/1992 | Shigezawa et al. |
| 5,163,755 A | | 11/1992 | Shimomura et al. |
| 5,167,519 A | * | 12/1992 | Jones et al. ................... 439/259 |
| 5,340,216 A | | 8/1994 | Goldschmidt |
| 5,484,206 A | | 1/1996 | Houldsworth |
| 5,741,072 A | | 4/1998 | Yamaguchi et al. |
| 5,741,073 A | | 4/1998 | Ribeiro et al. |
| 6,267,626 B1 | | 7/2001 | Hollander et al. |
| 6,850,859 B1 | | 2/2005 | Schuh |

FOREIGN PATENT DOCUMENTS

| | | |
|---|---|---|
| EP | 1014059 A1 * | 6/2000 |
| JP | 08 162220 | 6/1996 |

OTHER PUBLICATIONS

"Thermocouple Technical Reference Data", Thermocouple Technical Reference, ISE, Inc., 5 pages printed May 6, 2003, reprinted from the Internet at: http://instserv.com/tmocoupl.htm.

"Thermocouple Fundamentals", Temperature Thermocouple, Richard M. Park, no date available, 15 pages, reprinted from the internet at www.ecedirect.com.

* cited by examiner

| Thermocouple Type | Material Names | Element Symbols | Type/Polarity Designation | Seebeck Coefficient | Useful Application Temperature Range |
|---|---|---|---|---|---|
| J | Iron (+) | Fe | JP | .06 mV/°C | 200-1400°F 95-760°C |
|  | Constantan (-) | Cu-Ni | JN |  |  |
| K | Chromel (+) | Ni-Cr | KP | .041 mV/°C | 200-2300°F 95-1260°C |
|  | Alumel (-) | Ni-Al-Si | KN |  |  |
| T | Copper (+) | Cu | TP | .0415 mV/°C | -330-660°F -200-350°C |
|  | Constantan (-) | Cu-Ni | TN |  |  |

| Semi-Compensation Conductor Materials | Conductor Symbols | Seebeck Coefficient | Relative Figure of Merit As a Conductor in a Connector (4=Best, 1=Worst) | | | | |
|---|---|---|---|---|---|---|---|
| | | | Cost | Mechanical Properties | Thermal Properties | Electrical Properties | TOTAL |
| Palladium (+) | Pd | .006 mV/°C | 1 | 2 | 4 | 4 | 11 |
| Platinum (-) | Pt | | | | | | |
| Aluminum (+) | Al | .019 mV/°C | 4 | 1 | 3 | 3 | 11 |
| Nickel (-) | Ni | | | | | | |
| Copper (+) | Cu | .0224 mV/°C | 4 | 4 | 4 | 4 | 16 |
| Nickel (-) | Ni | | | | | | |
| Gold (+) | Au | .0224 mV/°C | 2 | 3 | 4 | 4 | 13 |
| Nickel (-) | Ni | | | | | | |
| Iron (+) | Fe | .035 mV/°C | 4 | 4 | 1 | 2 | 11 |
| Nickel (-) | Ni | | | | | | |

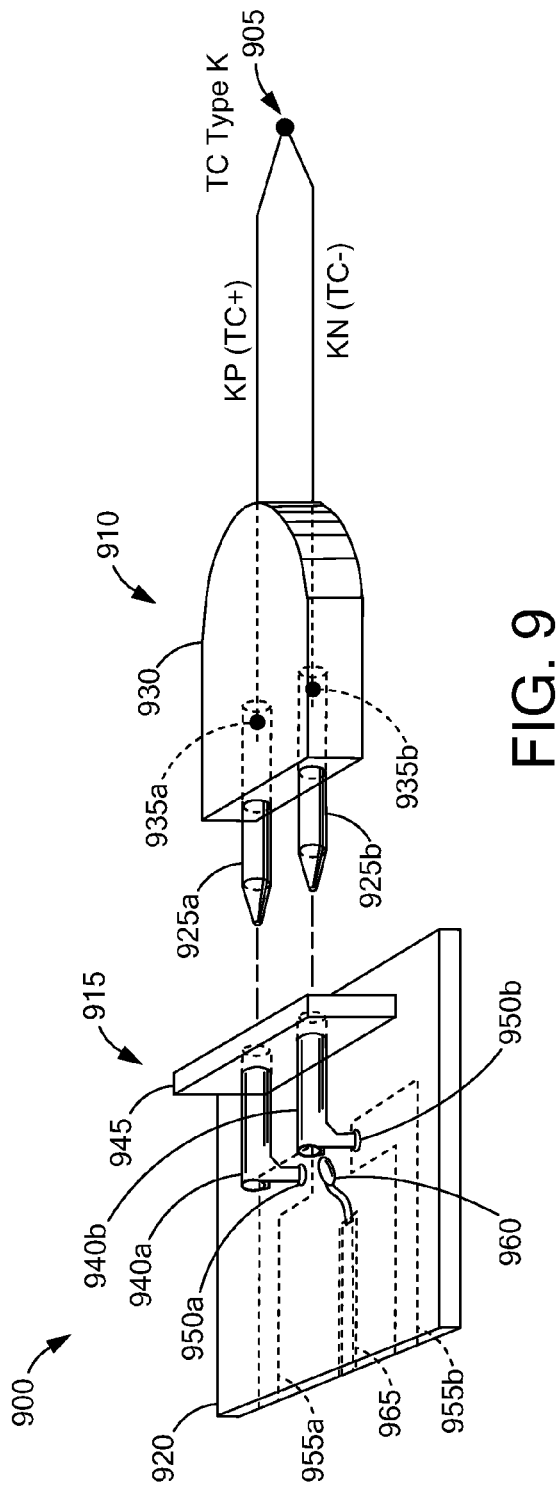
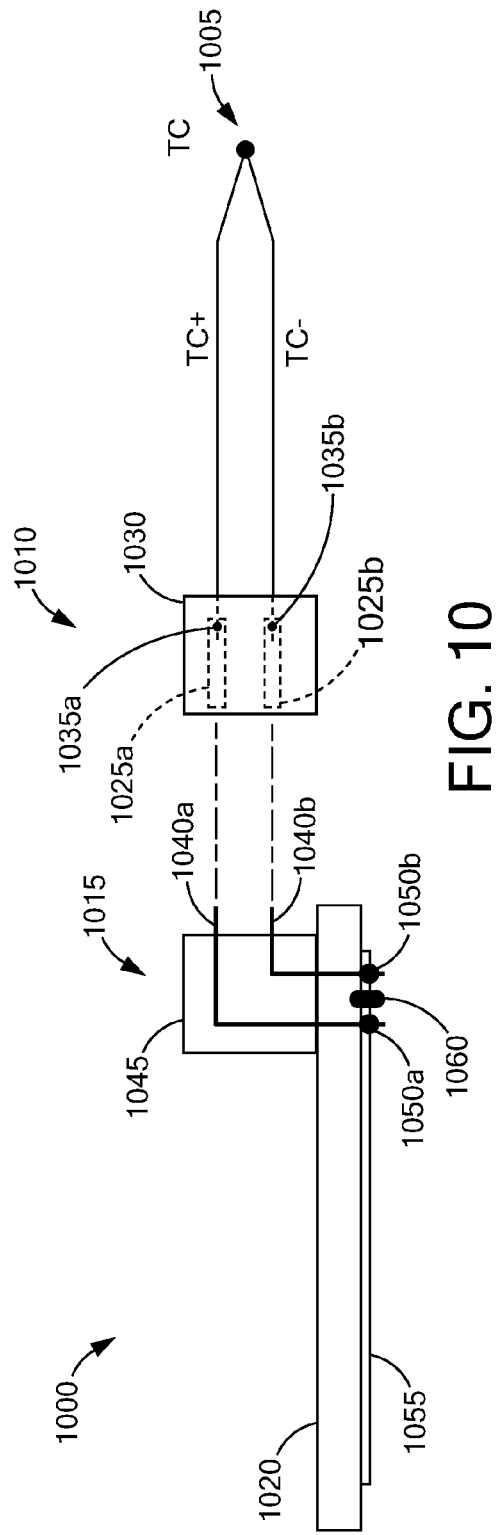
FIG. 9
FIG. 10

SEMI-COMPENSATED PINS FOR COLD JUNCTION COMPENSATION

CROSS REFERENCE TO RELATED APPLICATIONS

This application is a divisional of U.S. patent application Ser. No. 10/463,135 filed on Jun. 17, 2003 now U.S. Pat. No. 7,084,342.

FIELD OF THE INVENTION

The present invention relates generally to thermocouples and more particularly to apparatus and systems for partially compensating the cold junction of a thermocouple system using low cost semi-compensated conductors.

BACKGROUND OF THE INVENTION

Thermocouples are analog temperature sensors that utilize the thermoelectric properties of two dissimilar materials, typically metals, to generate an EMF in proportion to a temperature gradient across a material inhomogeneity. Common thermocouples used in temperature measurement comprise two metal wires of different thermoelectric properties called thermoelements connected at one end to form a "hot junction" also known as a "measuring junction". The other ends of the wires are connected to instrumentation such as a voltmeter to measure the EMF produced by the thermocouple. The wires are connected to the instrumentation at a known reference temperature to form a "reference junction" or a "cold junction". For the most precise measurements it is desirable that the only material inhomogeneity in the measurement circuit occurs at the measurement junction where the two dissimilar materials are joined.

Because it is undesirable to have any other EMF sources between the measurement junction and the reference junction, it is important that there is a minimal temperature gradient across the thermoelectric material and the electrical instrumentation leads. Thermocouple materials are specialized alloys while electrical instruments typically utilize common metals such as copper, nickel, gold, beryllium copper, aluminum, and a variety of plating materials. This material inhomogeneity at the reference termination can lead to significant errors unless care is taken to minimize temperature gradients in this region or to accurately characterize the gradients that exist.

In addition, thermocouple assemblies must use expensive hardware in the connection schemes at the termination end. Rather than using common contact materials such as copper, nickel, gold and others that are readily available, thermocouple connectors are made from more expensive thermocouple materials to minimize any inhomogeneity in the connector. A connector using thermocouple materials for the pins and sockets is referred to as a compensated connector. A compensated connector is designated to work only with a specific thermocouple type thus limiting the utility of the electronic instrumentation to only one type of sensor.

In thermocouple temperature measurement it is important to accurately establish the temperature of the reference junction in order to determine the temperature of the measured junction. In industrial temperature measurement, a temperature sensor such as an RTD, thermistor, diode, transistor, or an IC chip type sensor measures the cold junction. In almost all instances there will exist a temperature gradient between the cold junction sensor location and the location of the thermocouple leadwire termination. This temperature gradient is usually traversed by non-thermocouple wires or circuit board traces that generate little or no EMF. The result of this is an error in the temperature measurement that is approximately equal to the size of the temperature gradient.

A solution to the problem of a temperature gradient existing between the cold junction compensation (CJC) sensor and the thermocouple termination would be to use compensated materials for the lead connection and terminals. For example, a copper/constantan thermocouple (Type T) could use circuit board and terminals made from copper for the positive leg and constantan for the negative leg. This solution, however, has several negative aspects. The first and most obvious negative impact is the system is now only suitable for type T thermocouples because other types of thermocouples would experience an error from the different EMFs generated by the material differences. A second problem is a more practical problem of material availability. While copper is commonly available for terminals and printed circuit board traces, the other material, constantan, is not. Electrical hardware made from constantan or other common thermocouple alloys would be costly and would not be readily available.

Accordingly, there is a need for compensating the cold junction of a thermocouple system using low cost materials for system components accommodating various thermocouple types.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention is directed to a thermocouple system for partially compensating the cold junction of the system using low cost semi-compensated materially similar conductor pairs of system components, thereby enabling multiple thermocouple types to be universally applied to a single thermocouple monitoring system. The present invention further accommodates the application of a variety of conductor materials providing improved mechanical, electrical and thermal properties when used in connector terminals, pins, screws or other such system interconnection components while maintaining lower component costs and greater material availability.

Current trends in electronics packages for thermocouples are leading toward a next generation thermocouple monitoring system capable of universally accommodating various types of thermocouple materials. Beneficially, the present invention takes a big step toward meeting this need in the thermocouple industry by establishing a system comprising interconnection conductors providing cold junction compensation compatible with multiple thermocouple material types.

In conventional thermocouple systems, there are a number of interconnection junctions between the thermocouple and the monitoring instrumentation. For example, the thermocouple system may have junctions between the thermocouple leadwires and a pair of male connector pins, between the male connector pins and a pair of female connector pins, between the female connector pins and a printed circuit board, and potentially between the printed circuit board and the voltmeter.

Each of these junctions offers an opportunity for producing a material inhomogeneity and an EMF (e.g., a voltage) corresponding to the thermal differential across the materials. Ideally, the EMF produced corresponds to that of the particular thermocouple. This problem is commonly addressed by either providing materials that generally match those of the thermocouple, called "fully compensated" system, or simply use a common unmatched conductor material throughout all the junctions after the thermocouple, forming a substantially "uncompensated" system. Generally speaking, all of the aforementioned junctions except the measuring junction are in the relative vicinity of the cold junction. Therefore it is the cold junction which is typically either fully compensated by matched material use or substantially uncompensated. The present invention addresses the benefits of semi-compensated conductors for a partially compensated thermocouple system having multiple thermocouple types.

According to one aspect of the invention, a set of electrical connector pins for a thermocouple includes two materially similar conductor pairs, each conductor pair having conductors composed of a different material, and carried by an electrically insulating connector housing. The different materials of the conductor pairs provide a partial compensation to the thermocouple EMF developed between the hot junction and the cold junction when engaged thereto for the different type thermocouples. The conductors of each pair are operable to engage with two thermoelement conductors that form a thermocouple of differing types. The thermocouples provide a hot junction electrical interconnection therebetween at one end and are coupled to a cold junction at another end.

According to another aspect of the invention, an electrical connector is configured for mating to a thermocouple. The electrical connector includes two materially similar elongated metallic conductor pairs, each conductor pair composed of two different metals. The different metals of each of the elongated metallic conductor pairs provide a partial compensation to the thermocouple EMF developed at the cold junction of the respective thermocouple when engaged thereto. The conductor pairs are operable to engage with two other mating pairs of connector conductors electrically connected to two different thermocouple types to provide a hot junction electrical interconnection therebetween at one end and couple to a cold junction at another end. Also included is an electrically insulating connector housing through which each conductor is carried with each conductor positioned to project from the connector housing.

According to yet another aspect of the invention, an electrical connector is configured for mating to a thermocouple. The electrical connector includes two elongated metallic conductors. Each of the conductors is composed of a different material. The different metals of the conductors are adapted to provide a partial compensation to the thermocouple EMF developed at the cold junction of the thermocouple when engaged thereto. The conductors are operable to engage with two other mating connector conductors electrically connected to a thermocouple and provide a hot junction and electrical interconnection therebetween at one end and couple to a cold junction at another end. Also included is an electrically insulating connector housing. Each conductor is carried by the connector housing and is positioned to project from the connector housing.

To the accomplishment of the foregoing and related ends, the following description and annexed drawings set forth in detail certain illustrative aspects and embodiments of the invention. These are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

FIG. 3 is a chart of some of the properties of several thermocouple thermoelements such as may be used in the thermocouple system of the present invention;

FIG. 8 is a chart of some of the properties and relative merits of several exemplary thermocouple system conductors such as may be used in a variety of connectors of the TC systems of the present invention for partially compensating the cold junction in accordance with several aspects of the present invention;

FIGS. 9-10 illustrate several exemplary TC systems in accordance with various aspects of the present invention wherein the semi-compensating conductors of FIG. 8 and other such conductor combinations may be used;

DETAILED DESCRIPTION OF THE INVENTION

Figure 1:
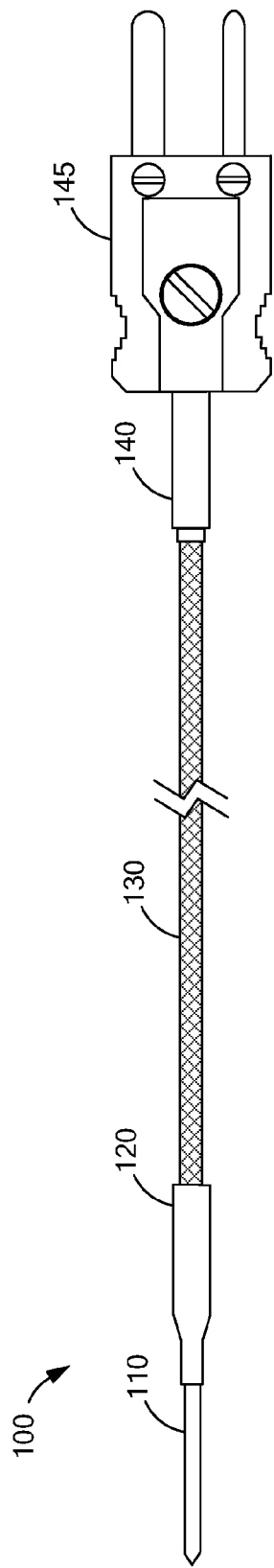
FIG. 1 is a prior art diagram illustrating a conventional thermocouple device as provided by a thermocouple manufacturer such as may be used in a temperature monitoring system.

The present invention will now be described with reference to the attached drawings, wherein like reference numerals are used to refer to like elements throughout. The invention relates to a thermocouple measurement system for partially compensating the cold junction of the system using materially similar pairs of system components comprising low cost conductors, thereby enabling multiple thermocouple types to be universally applied to a single thermocouple monitoring system.

Conventionally, expensive thermoelements may be used to fully compensate the junctions of a TC system. Alternately, conventional systems may not use any cold junction compensation rather than absorb the high cost of thermoelement based connection hardware. The thermocouple system of the present invention, rather, strikes a midway approach to either of these extremes, and in the process further presents a solution that provides a thermocouple system that is equally suited to a variety of TC material types. In order to better appreciate one or more features of the invention, several exemplary implementations of the temperature monitoring system, the thermoelements, some of the semi-compensation conductors and the benefits of each are hereinafter illustrated and described with respect to the following figures.

Figure 2:
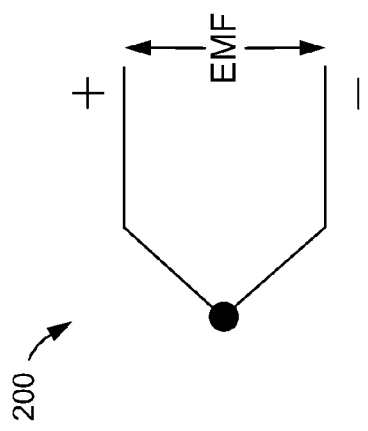
FIG. 2 is an accompanying schematic symbol of the prior art thermocouple of FIG. 1, and the polarity of an EMF provided by the device.

FIG. 1 illustrates a conventional thermocouple device 100, such as may be provided by a thermocouple manufacturer and used in a temperature monitoring system, while FIG. 2 illustrates an accompanying schematic symbol 200 of the thermocouple of FIG. 1. Most common thermocouples are temperature measuring devices or sensors comprising two dissimilar metals connected together at one end, called the hot junction. The two metals have a polarity with respect to each other and one of these is referred to as the positive leg and the other as the negative leg. The two free ends, called the cold end, generate a voltage (EMF) proportional to the temperature difference between the hot end and the cold end.

Referring back to FIG. 1, the conventional thermocouple typically has a stainless steel sheath 110 for protection over the hot junction that may be potted therein (e.g., a ceramic, or epoxy potting material), together with a transition 120 (e.g., stainless steel) to protect the transition to a length of high temperature insulated leadwire 130. The leadwire 130 may also have a length of heatshrink protection and a label 140 before it terminates in a mini-plug connector 145.

FIG. 3 illustrates a chart 300 of some of the properties of several thermocouple thermoelements such as may be used in a variety of thermocouple systems including the TC system of the present invention. Many of the more commonly used thermoelement combinations have been assigned letter designations (e.g., J, K, and T) for easy reference to their more complex material and elemental compositions shown. Each thermoelement material combination has a more positive and a more negative polarity based on the thermal characteristics of each element which provides an EMF, identified as the Seebeck Coefficient, as a function of the thermal differential between the hot and cold junction of each TC type. Each TC combination also has a useful operating temperature range, also based on the thermal and mechanical characteristics of the elemental compositions.

For example, the K type thermocouple is comprised of a nickel-chrome (+) thermoelement (typically in the form of a wire) joined to a nickel-aluminum-silicon (−) thermoelement. Nickel-chrome is the more positively polarized type K thermoelement (KP) comprising Nickel and Chromium, while the more negatively polarized Nickel-aluminum-silicon thermoelement (KN) comprises Nickel, Aluminum and Silicon. This TC combination provides a Seebeck Coefficient of approximately 0.041 mV/° C. over a 0-1260° C. temperature range. This may best be appreciated in the following figures.

FIGS. 4-7 illustrate several diagrams of the temperature at various junctions of several types of thermocouple systems used for temperature monitoring. FIGS. 4-7 also illustrate the EMF detected using the thermoelements and conductors between each junction and the EMF produced by a CJC sensor that is typically located as close as possible to the cold junction for measuring the cold junction temperature.

Figure 4:
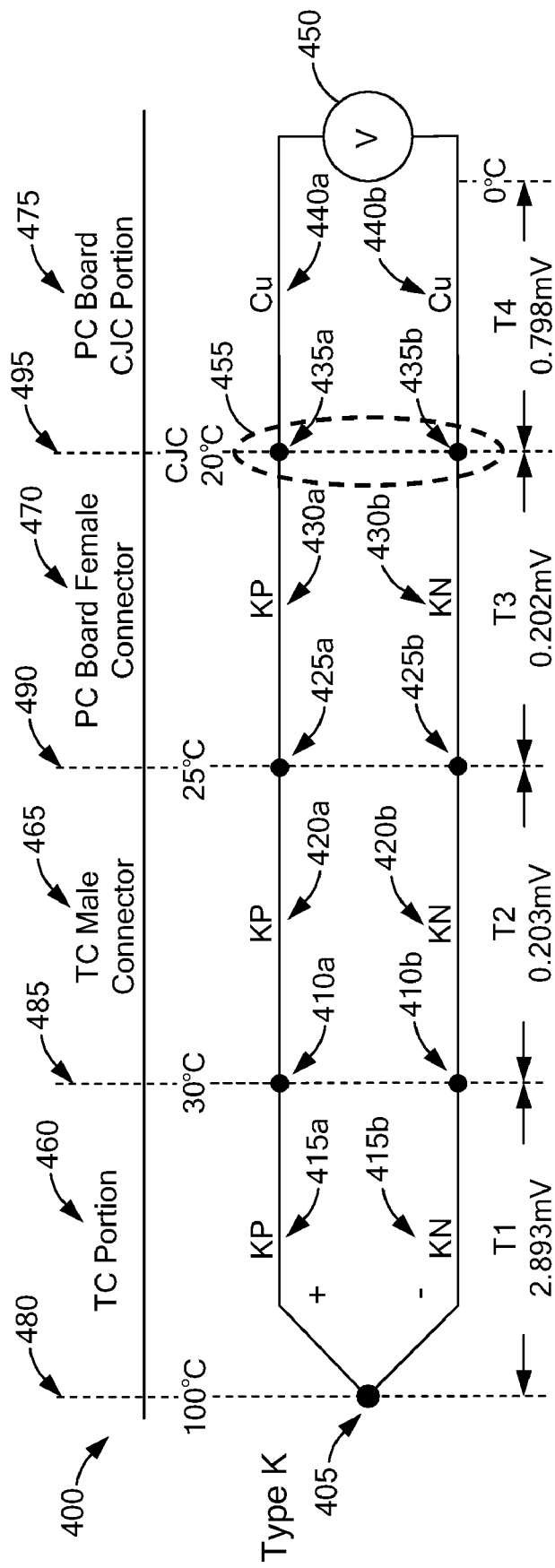
FIG. 4 is a diagram illustrating the temperature at various junctions of an exemplary fully compensated thermocouple system used for temperature monitoring, demonstrating the EMF detected using the thermoelements and conductors between each junction and the EMF produced by the CJC sensor.

FIG. 4, for example, illustrates a diagram of an exemplary fully compensated thermocouple system 400 used for temperature monitoring. As previously discussed, in current thermocouple systems, there are a number of interconnection junctions between the thermocouple and the monitoring instrumentation. In FIG. 4, for example, the thermocouple system 400 comprises a type K thermocouple measuring junction 405 and may have junctions 410a, 410b in the type K positive (KP) leadwire 415a and negative (KN) leadwire 415b, respectively, between the thermocouple leadwires 415 and a pair of male connector pins KP 420a and KN 420b.

The KP notation on both sides of junction 410a, and the KN on both sides of junction 410b indicate that no material inhomogeneity has taken place at these junctions between the TC leadwire and the male connector pins. The fully compensated TC system 400 has another junction 425a, 425b between the male connector pins KP 420a and KN 420b and a pair of female connector pins KP 430a, KN 430b, again with no material inhomogeneity. Finally, the fully compensated TC system 400 has a junction 435a, 435b between the female connector pins KP 430a, KN 403b and a printed circuit board. The printed circuit board PCB typically has copper printed circuit traces 440a, 440b that are eventually connected to a voltmeter 450. This final female connector to PCB junction 435 is the only junction in the system with a material inhomogeneity or a material transition 455.

Although there is a material transition 455 at this junction 435a, 435b, because a CJC sensor is utilized at this junction establishing a known reference temperature, the cold junction is said to be fully compensated to this point.

In FIGS. 4-7, exemplary temperature zones (T1-T4) are illustrated at four identified junctions of the systems and the EMFs produced by the dissimilar materials (thermoelements and conductors) between each junction and the EMF produced by the CJC sensor. The four identified junctions of the system also divide the system into four basic sections or portions, a TC portion 460, a TC male connector 465, a PC board female connector 470, and the PC board CJC Portion 475. The four temperature zones chosen are: a 100° C. measurement temperature 480 at the TC thermocouple junction (e.g., 405 of FIG. 4), a 30° C. temperature 485 at the TC to TC male connector junction (e.g., 410a, 410b of FIG. 4), a 25° C. temperature 490 at the TC male to PCB female connector junction (e.g., 425a, 425b of FIG. 4), and a 20° C. temperature 495 at the PCB female to PCB CJC portion junction (e.g., 435a, 435b of FIG. 4).

Given these temperature differentials and the TC materials used, the EMF produced in each section of the fully compensated system of FIG. 4 is as follows:

| Area | Material | Temp differential | EMF |
| --- | --- | --- | --- |
| TC Portion | K | T1 = (100 − 30)° C. = 70° C. | =2.893 mV |
| TC Male Conn. | K | T2 = (30 − 25)° C. = 5° C. | =0.203 mV |
| PCB Female Conn. | K | T3 = (25 − 20)° C. = 5° C. | =0.202 mV |
| PCB CJC Portion | CJC | T4 = (20 − 0)° C. = 20° C. | =0.798 mV |
| | | TOTAL = | =4.096 mV |

Since a type K thermocouple produces 4.096 mV at 100° C., there is no error produced by the fully compensated TC system having a single material inhomogeneity 455 after that of the TC measurement junction 405, and then only at the cold junction.

Figure 5:
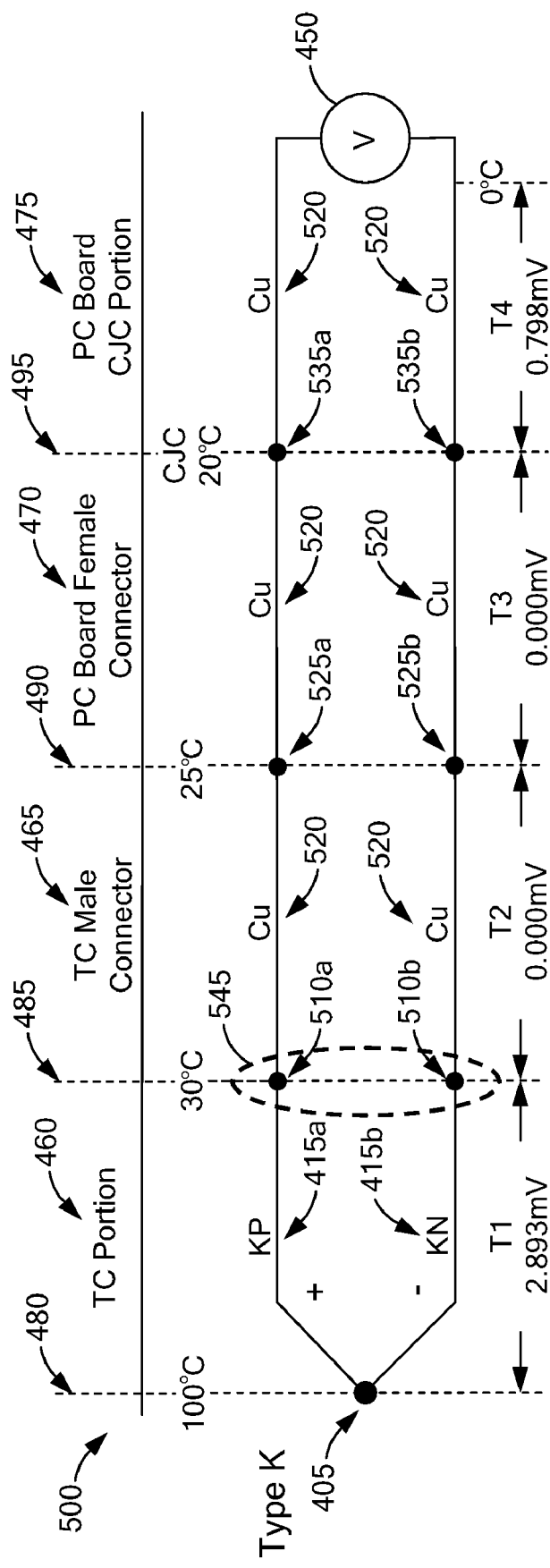
FIG. 5 is a diagram illustrating the temperature at various junctions of an exemplary uncompensated thermocouple system used for temperature monitoring, demonstrating the EMF detected using the thermoelements and conductors between each junction and the EMF produced by the CJC sensor.

By contrast, FIG. 5 illustrates an exemplary uncompensated thermocouple system 500 used for temperature monitoring. This TC system 500 is illustrated similar to that of FIG. 4 except that the only thermoelements used in the system are the thermoelements KP 415*a*, KN 415*b* used in the type K thermocouple itself of the TC portion 460. For example, a single conductor such as copper 520 is used throughout the rest of the system 500 from junction 510*a*, 510*b*, to a connector junction 525*a*, 525*b*, to the CJC junction 535*a*, 535*b*. Therefore the uncompensated system 500 of FIG. 5, also has only one junction of material inhomogeneity 555 after that of the TC measurement junction 405. As previously discussed, the problem here is that no EMF is generated across the homogenous material junctions to compensate the actual temperature differentials across those conductors.

Given the same temperature differentials, and the TC materials used in accordance with the uncompensated system of FIG. 5, the EMF produced in each section is as follows:

| Area | Material | Temp differential | EMF |
| --- | --- | --- | --- |
| TC Portion | K | T1 = (100 − 30)° C. = 70° C. | =2.893 mV |
| TC Male Conn. | Cu | T2 = (30 − 25)° C. = 5° C. | =0.000 mV |
| PCB Female Conn. | Cu | T3 = (25 − 20)° C. = 5° C. | =0.000 mV |
| PCB CJC Portion | CJC | T4 = (20 − 0)° C. = 20° C. | =0.798 mV |
| | | TOTAL = | =3.691 mV |

Since a type K thermocouple produced 3.691 mV due to the thermal EMFs representing 90° C. while the actual temperature is 100° C., there is an error of 10° C. produced by the uncompensated TC system of FIG. 5, having a single material inhomogeneity 545 after the TC measurement junction 405, and does not reside at the cold junction. Although this system is much less expensive than that of the fully compensated system of FIG. 4, a significant error is also likely.

A better solution to these extremes is the use of common materials to create semi-compensated terminations, for example, in the conductors or terminal pins of the connectors discussed. Semi-compensated electrical hardware of the present invention generate a portion of the EMF expected from common thermocouple types over any temperature gradient existing between the CJC sensor and the electrical termination. For instance, electrical hardware using copper for the positive leg connections and nickel for the negative leg connection yields a combination Cu/Ni Seebeck coefficient of:

$$Cu = 0.0076 \text{ mV/}° C$$
$$\underline{Ni = -0.0148 \text{ mV/}° C}$$
$$Cu - Ni = 0.0224 \text{ mV/}° C$$

This Cu—Ni combination produces about half the EMF output of a type K thermocouple that produces roughly 0.041 mV/° C. near room temperature. Thus the semi-compensated materials would correct about ½ of the EMF of a type K thermocouple. While this is not a perfect compensation it has the advantage of being made from common materials and being applicable to a variety of other thermocouple types. A type J thermocouple has around 0.06 mV/° C. and so the semi-compensated conductors (e.g., pins, terminals, etc.) would recover around a third of any error associated with a temperature gradient across a junction or connector inhomogeneity.

Figure 6:
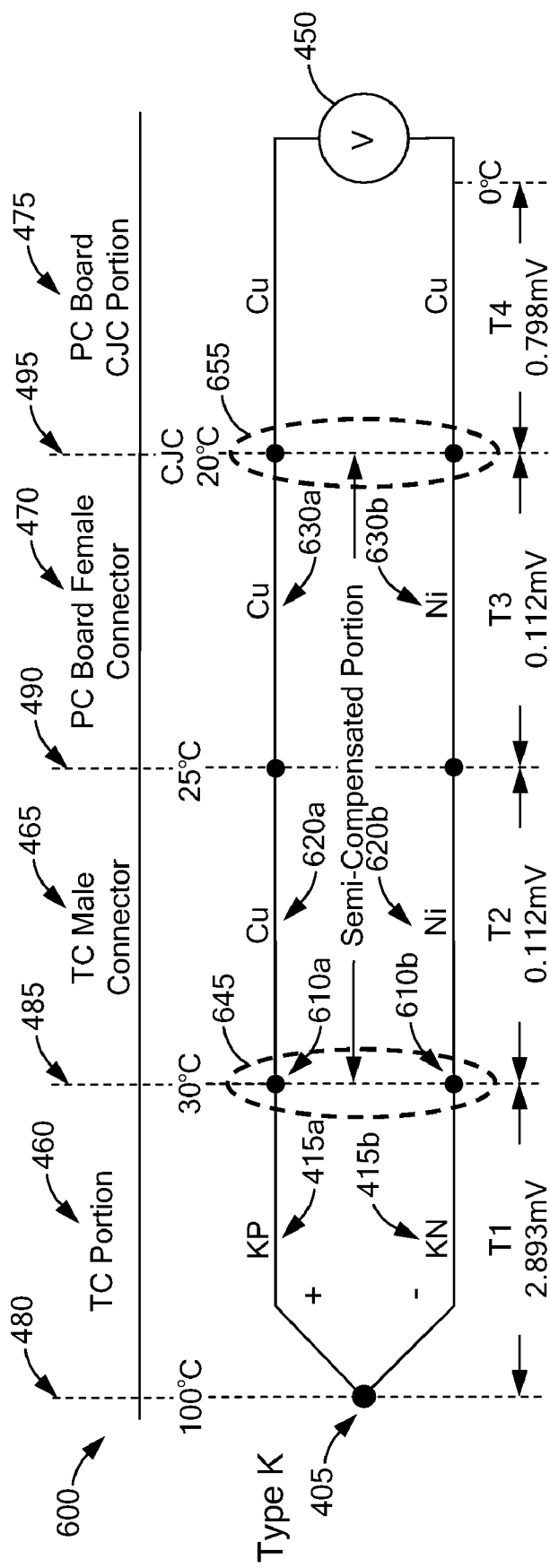
FIG. 6 is a diagram illustrating the temperature at various junctions of an exemplary semi-compensated thermocouple system for temperature monitoring in accordance with the present invention, demonstrating the EMF detected using the thermoelements and conductors between each junction and the EMF produced by the CJC sensor.
Figure 7:
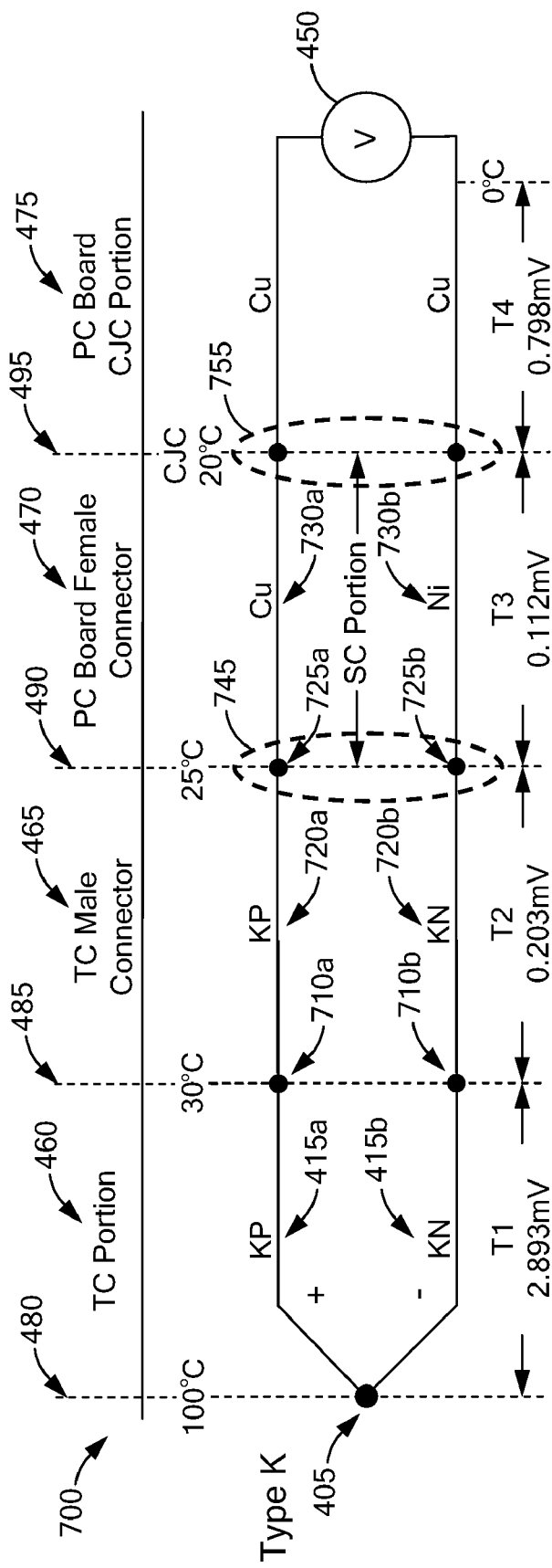
FIG. 7 is a diagram illustrating the temperature at various junctions of another exemplary semi-compensated thermocouple system for temperature monitoring in accordance with the present invention, demonstrating the EMF detected using the thermoelements and conductors between each junction and the EMF produced by the CJC sensor.

FIGS. 6 and 7, for example, illustrate exemplary semi-compensated thermocouple systems 600 and 700, respectively, for partially compensated temperature monitoring in accordance with the present invention. FIGS. 6 and 7 provide junctions between each of the same four areas or portions of the system as identified previously in FIGS. 4 and 5, namely: the TC portion 460, the TC male connector region 465, the PC board female connector region 470, and the PC board CJC portion 475. FIGS. 6 and 7 are also illustrated using the same four temperatures: 100° C. at 480, 30° C. at 485, 25° C. at 490, and 20° C. at 495, as used in FIGS. 4 and 5.

By contrast to either the fully compensated or the uncompensated TC system, semi-compensation is provided by the choice of the conductors used between the TC portion 460 and the PC board CJC portion 475, that is, in what is termed herein, the "semi-compensated portion", or SC portion. The SC portion is further defined and bounded by at least two junctions having material inhomogeneities (e.g., 645 and 655 of FIG. 6, or 745 and 755 of FIG. 7).

For example, in FIG. 6, junction 610*a*, 610*b* transitions from KP/KN to Cu/Ni, respectively. Although 645 is a material inhomogeneity, an EMF is still produced traversing conductors 620*a*, 620*b* and 630*a*, 630*b* within the connectors 465 and 470 because the materials of conductors 620*a* and 620*b* are dissimilar, and because the materials of conductors 630*a* and 630*b* are dissimilar (e.g., Cu vs. Ni, respectively). Thus, the material inhomogeneities 645 and 655 of the exemplary TC system of FIG. 6 define an SC portion for partially compensating the cold junction.

Using the same temperature differentials as before, and the TC materials and conductor materials of the semi-compensated system of FIG. 6, the EMF produced in each section is as follows:

| Area | Material | Temp differential | EMF |
| --- | --- | --- | --- |
| TC Portion | K | T1 = (100 − 30)° C. = 70° C. | =2.893 mV |
| TC Male Conn. | Cu/Ni | T2 = (30 − 25)° C. = 5° C. | =0.112 mV |
| PCB Female Conn. | Cu/Ni | T3 = (25 − 20)° C. = 5° C. | =0.112 mV |
| PCB CJC Portion | CJC | T4 = (20 − 0)° C. = 20° C. | =0.798 mV |
| | | TOTAL = | =3.915 mV |

Since a type K thermocouple produces 3.915 mV due to thermal EMFs representing 95° C. while the actual temperature is 100° C., there is an error of 5° C. produced by the semi-compensated TC system of FIG. 6, having at least two material inhomogeneities 645 and 655 after the TC measurement junction 405. The semi-compensated system 600 is still much less expensive than that of the fully compensated system 400 of FIG. 4, but only produces half the error of the uncompensated system 500 of FIG. 5. In addition to providing the cost advantage, other mechanical, electrical, and thermal benefits of the Cu/Ni combination and other semi-compensating conductor combinations are obtained and will be discussed in more detail in association with FIG. 8.

In another semi-compensation example of the present invention illustrated in FIG. 7, junction 710*a*, 710*b* may retain the type K materials in the TC male connector 465 conductors KP 720a and KN 720b, then at junction 725a and Ni 730b, respectively, producing a material inhomogeneity 745. Again, although 745 is a material inhomogeneity, an EMF is still produced traversing conductors 720a, 720b and 730a, 730b within the connectors 465 and 470 because the materials of conductors 720a and 720b are dissimilar, and because the materials of conductors 730a and 730b are dissimilar (e.g., Cu vs. Ni, respectively). Thus, the material inhomogeneities 745 and 755 of the exemplary TC system of FIG. 7 define an SC portion for partially compensating the cold junction.

Using the same temperature differentials as before, and the TC materials and conductor materials of the semi-compensated system of FIG. 7, the EMF produced in each section is as follows:

| Area | Material | Temp differential | EMF |
| --- | --- | --- | --- |
| TC Portion | K | T1 = (100 − 30)° C. = 70° C. | =2.893 mV |
| TC Male Conn. | K | T2 = (30 − 25)° C. = 5° C. | =0.203 mV |
| PCB Female Conn. | Cu/Ni | T3 = (25 − 20)° C. = 5° C. | =0.112 mV |
| PCB CJC Portion | CJC | T4 = (20 − 0)° C. = 20° C. | =0.798 mV |
| | | TOTAL = | =4.006 mV |

Since a type K thermocouple produces 4.006 mV due to thermal EMFs representing 97.5° C. while the actual temperature of 100° C., there is an error of only 2.5° C. produced by the semi-compensated TC system of FIG. 7, having at least two material inhomogeneities 745 and 755 after the TC measurement junction 405. The semi-compensated system 700 is still less expensive than that of the fully compensated system 400 of FIG. 4, but only produces one quarter of the error of the uncompensated system 500 of FIG. 5.

Thus, several electrical and economic benefits of using common semi-compensating conductor materials for the junctions of a single TC type measurement system have been shown. However, further economic and user advantages are available in providing a TC monitoring system, in accordance with the present invention, wherein the same pair combination of conductor materials is used for a TC system having multiple TC types. In particular, it is advantageous for the user of the system to be able to plug any number of a list of thermocouples into the same thermocouple receptacles, as well as less expensive for the manufacturer to supply a connector, screws or pins, for example, with common and more readily available hardware materials.

To avoid the electrical loss of uncompensated hardware, and the high cost and poor material availability of fully compensated hardware, the present invention attempts to provide a system using materially similar pairs of common conductor materials for receiving multiple TC types. For example, as will be further shown in association with the following figures, two various types (e.g., type J, T, K, N, S) of thermocouples may be both interconnected into a TC system using two pairs of Cu vs. Ni semi-compensating conductor hardware.

There are a variety of material combinations for semi-compensated conductors or pins including aluminum vs. nickel with a Seebeck coefficient of around 0.019 mV/° C., or palladium vs. platinum at 0.006 mV/° C. Thus, a variety of semi-compensation levels are available to accommodate various requirements of the system as shown in the following figure.

FIG. 8, for example, illustrates a chart 800 of several exemplary semi-compensation conductor combinations that may be used for partially compensating the cold junction of the TC systems in accordance with several aspects of the present invention. The list of semi-compensation conductors is ordered from lowest to highest Seebeck coefficient. Chart 800 further compares some of the properties and relative merits of the exemplary semi-compensation conductor combinations such as may be applicable to a variety of pins, terminals, and screw connectors and terminal strips, however, copper and nickel appear to be one of the more preferred embodiments.

In addition, the specific combination of semi-compensation conductors may be selected in accordance with an aspect of the present invention to best coordinate with the range of Seebeck coefficients of the thermocouples used, to provide a particular level of compensation desirable for the TC system application. If, for example, a TC System uses a type J and a type K thermocouple, another set of semi-compensated conductors could be selected for the TC system, which provided a Seebeck coefficient midway between that of the type J and K thermocouples, yet had good cost, mechanical, electrical and thermal properties similar to those of the Cu/Ni combination, a higher level of semi-compensation may be attained for the TC system at a low cost.

For example, an Iron/Nickel combination would be the best choice from FIG. 8 with the highest Seebeck coefficient output of 0.035 mV/° C. to coordinate with the type J and K thermocouple Seebeck coefficients of 0.06 mV/° C. and 0.041 mV/° C., respectively, but the Fe/Ni combination may have poor electrical and thermal properties compared to the use of Cu/Ni that may outweigh the EMF advantage of Fe/Ni in many applications. Although the Cu vs. Ni conductor combination has been shown and described in the examples and figures of the invention, a variety of other combinations of semi-compensation conductors including metals, alloys, and metal or alloy platings and depositions are also anticipated in the context of the present invention.

Figure 11:
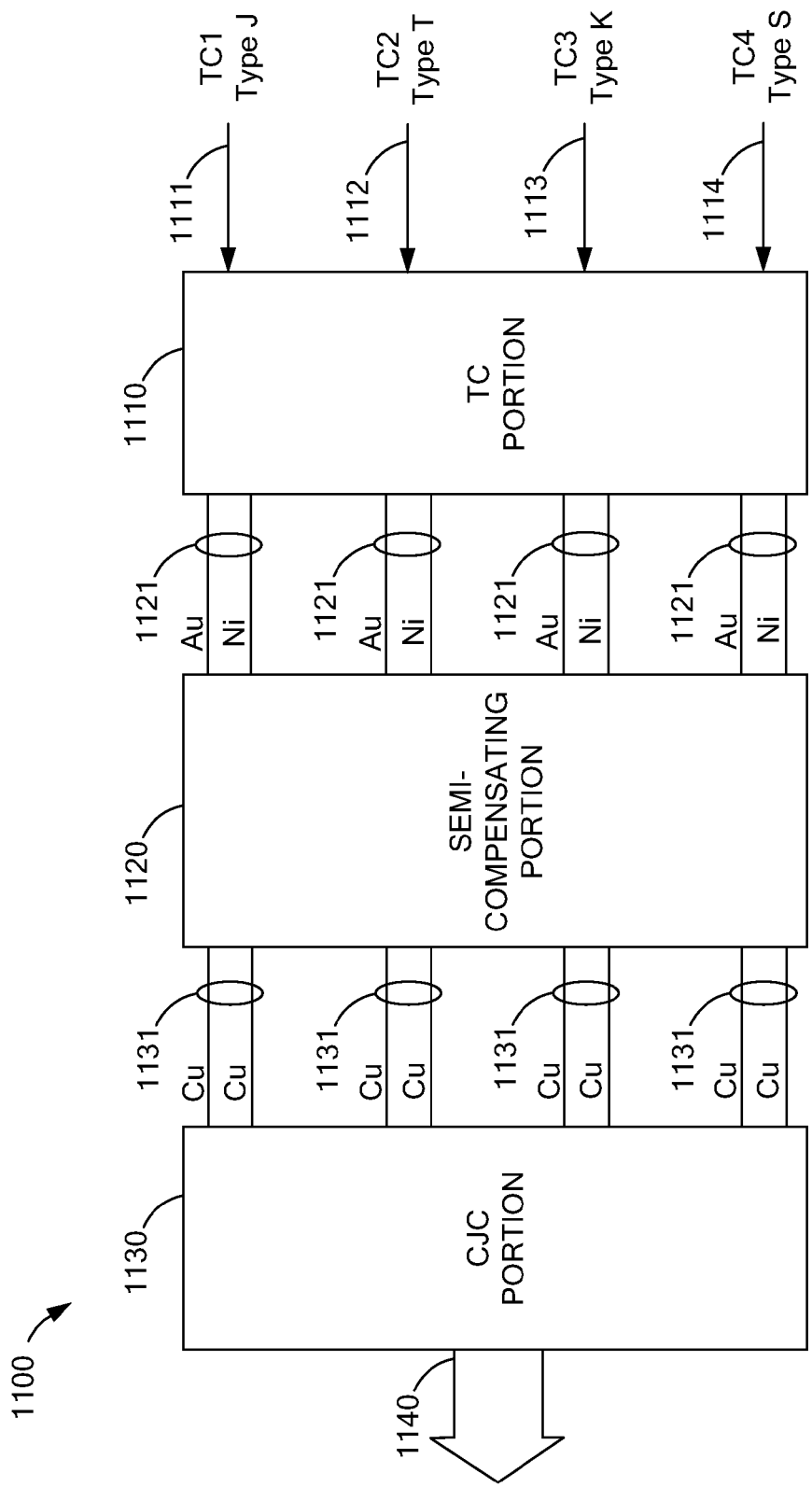
FIGS. 11-13 illustrate a TC system comprising multiple TC types, having a semi-compensation portion with materially similar conductor pairs, in accordance with the present invention.
Figure 12:
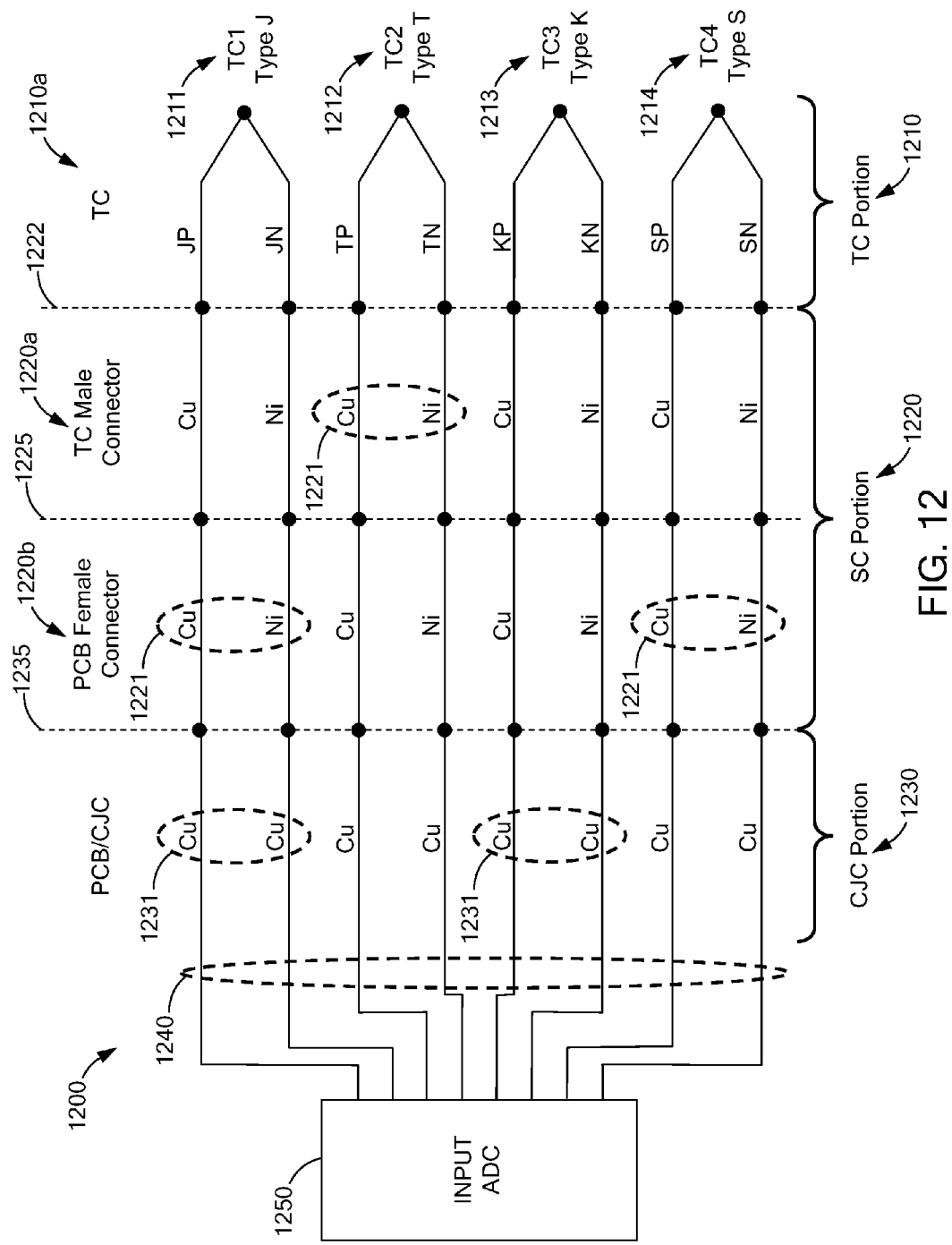
Figure 13:
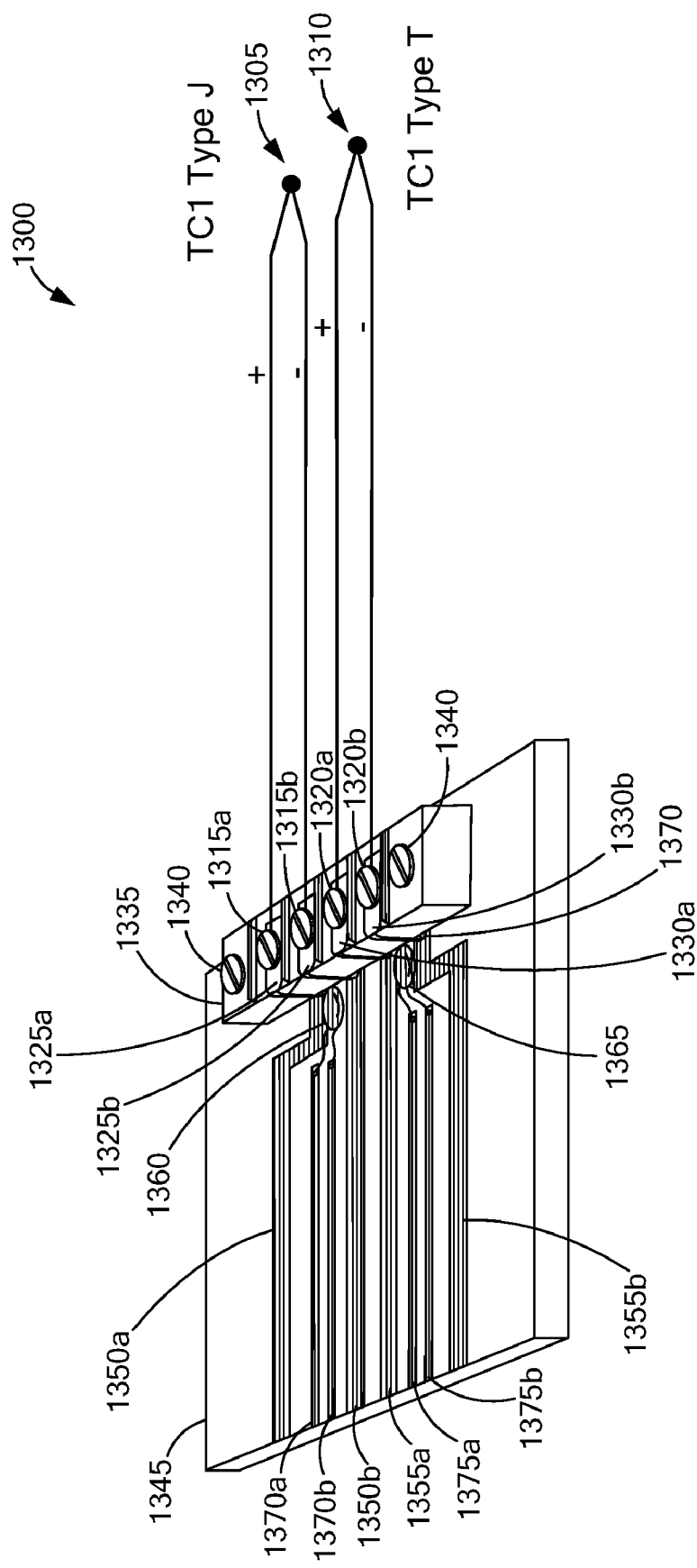
Figure 14:
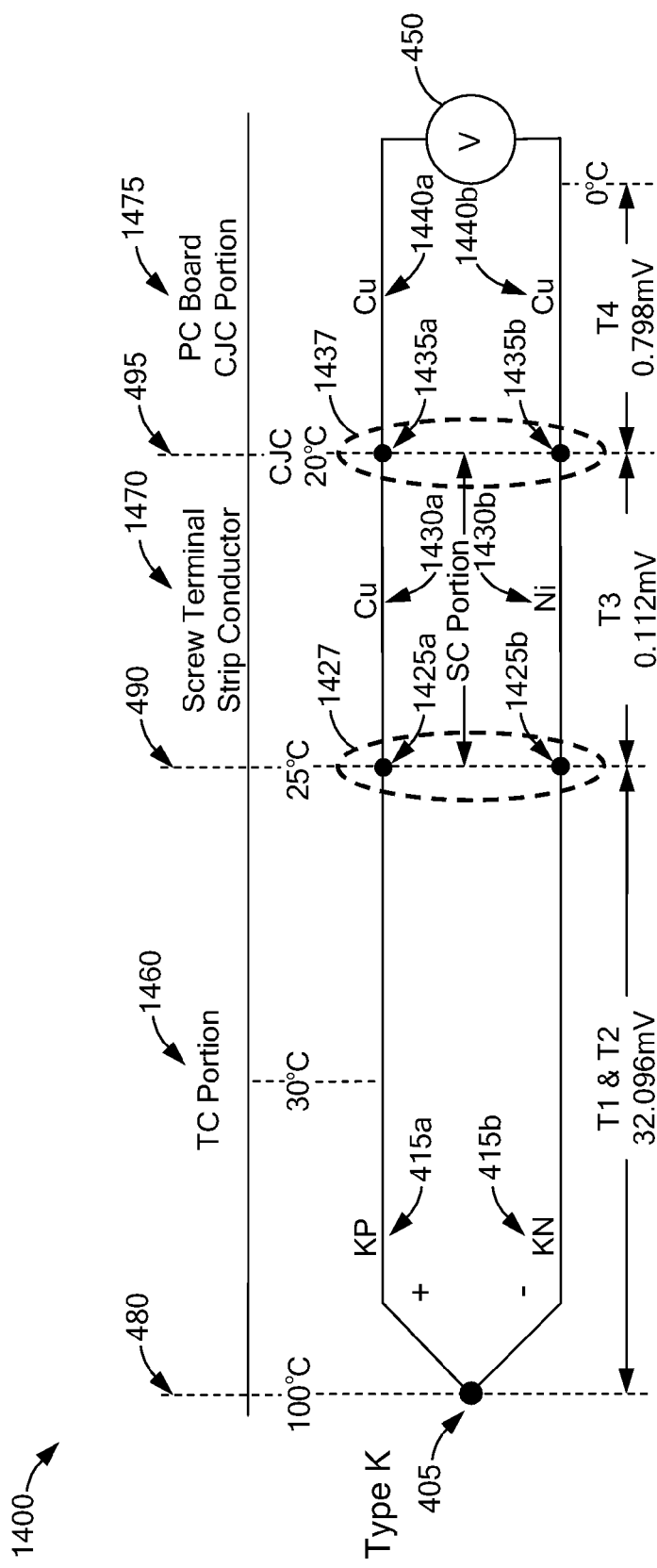
FIG. 14 is a diagram illustrating the temperature at various junctions of yet another exemplary semi-compensated thermocouple system for temperature monitoring using a screw terminal strip connector in accordance with the present invention, demonstrating the EMF detected using the thermoelements and conductors between each junction and the EMF produced by the CJC sensor.

FIGS. 9-14 illustrate several exemplary TC systems in accordance with various aspects of the present invention and FIGS. 6 and 7, wherein the semi-compensating conductors of FIG. 8 and other such conductor combinations may be used to partially compensate a cold junction of the system. A variety of pins, terminals, and screws of connectors and terminal strips are used in the TC systems illustrated in the figures, wherein one or more semi-compensation conductor combinations may be utilized. FIGS. 11-13 illustrate a TC system comprising multiple TC types, having a semi-compensation portion with materially similar conductor pairs, in accordance with the present invention. Although FIGS. 9, 10 and 14 illustrate only one conductor pair of a multiple TC type system, it should be appreciated that other such TC types will also be coupleable to the conductor pair illustrated together with other conductor pairs, whereby semi-compensation of the system is accomplished.

FIG. 9 illustrates an exemplary semi-compensated TC system 900. TC system 900 uses a type K thermocouple sensor 905 having a male plug 910. The male plug 910 engages a female connector 915 affixed to a printed circuit board (PCB) 920. The positive KP (TC+) and negative KN (TC−) lead-wires of the type K TC 905 are connected to a pair of male pins 925a and 925b, respectively, mounted in an insulative plug housing 930 of the male plug 910. A junction 935a, 935b having a material inhomogeneity is formed where the lead-wires KP/KN join the male pins 925a, 925b (e.g., Cu/Ni pins), respectively, mounted in an insulative receptacle housing 945 of the female receptacle 915. Another junction is formed where the male pins 925a, 925b engage the female pins 940a, 940b, respectively. Typically, this junction will not, but may or may not have a material inhomogeneity.

Another junction terms a cold junction 950a, 950b having a material inhomogeneity is formed where the female pins 940a, 940b (e.g., Cu/Ni pins) attach to the traces 955a, 955b (e.g., typically copper traces), respectively, of the PCB 920. Near, and usually between the junctions 950a,950b, where the female pins 940a, 940b join the PCB 920, a cold junction compensation CJC sensor 960 (e.g., an RTD, thermistor, diode, transistor, or an IC chip type sensor) is mounted to detect the temperature of the cold junction 950a, 950b for CJC temperature correction of the TC system. PCB traces 965 attach to the CJC sensor 960 for external detection of the ambient temperature at the cold junction 950a, 950b. Knowing the CJC temperature is usually critical to the accurate ambient temperature compensation of the system, so CJC sensor 960 may also be potted or otherwise thermally bonded near the cold junctions 950a, 950b.

Thus, in the example of FIG. 9, two junctions (935a, 935b and 950a, 950b) having material inhomogeneities in accordance with the invention are present in the semi-compensated TC system 900. TC system 900 utilizes semi-compensated conductor material combinations (e.g., Pd/Pt, Cu/Ni, Al/Ni, Au/Ni, and Fe/Ni) in the form of male and female pins 925a, 925b and 940a, 940b, respectively. The male and female pins in this example form the semi-compensated portion (SC portion) of the system 900 referred to in the system 600 of FIG. 6. If in this example Cu/Ni were used for the semi-compensation materials for these conductors, the error produced by the system would correspond to that of system 600 of FIG. 6. Alternately, if the male pins 925a, 925b were comprised of KP/KN material, and only the female pins 940a, 940b were comprised of the Cu/Ni semi-compensation conductor materials, the error produced by the system would correspond to that of system 700 of FIG. 7.

Although a male plug/pins has been shown and described in the examples and figures of the invention in association with a thermocouple, and a female receptacle/pins has been used in association with a PCB, a female plug/pins used in association with the thermocouple, and a male receptacle/pins used in association with the PCB or wiring to another such circuit is also anticipated in the context of the present invention.

FIG. 10 illustrates another exemplary semi-compensated TC system 1000. TC system 1000 is similar to that of TC system 900 of FIG. 9 in many ways and therefore need not be described again in detail except where the systems differ. For example, system 1000 again is illustrated using a type K thermocouple sensor 1005 attached to a plug 1010 that engages a receptacle 1015 affixed to a printed circuit board (PCB) 1020. In this example, the plug 1010 and receptacle 1015 are configured as PCB mounted pin/socket header type connectors. The positive and negative leadwires KP/KN of the type K TC 1005 are connected to a pair of female pins 1025a and 1025b this time, respectively, mounted in an insulative plug housing 1030 of the plug 1010. A junction 1035a, 1035b having a material inhomogeneity is formed where the KP/KN leadwires join the female pins 1025a, 1025b (e.g., Al/Ni pins), respectively. The female pins 1025a, 1025b engage male pins 1040a, 1040b (e.g., Al/Ni pins), respectively, mounted in an insulative receptacle housing 1045 of the receptacle 1015. Another junction is formed where the male pins 1025a, 1025b engage the female pins 1040a, 1040b, respectively.

A cold junction 1050a, 1050b having the second material inhomogeneity is formed where the male pins 1040a, 1040b (e.g., Al/Ni pins) attached to the traces 1055 (e.g., typically copper traces) of the PCB 1020. A cold junction compensation CJC sensor 1060 (e.g., an RTD, thermistor, diode, transistor, or an IC chip type sensor) is mounted near the PCB junctions 1050a, 1050b of the male pins 1040a, 1040b to detect the temperature of the cold junction 1050a, 1050b for CJC temperature correction of the TC system 1000.

Thus, in the example of FIG. 10, two junctions (1035a, 1035b and 1050a, 1050b) having material inhomogeneities in accordance with the invention are formed in the semi-compensated TC system 1000. Again, the TC system 1000 utilizes semi-compensated conductor material combinations (e.g., Pd/Pt, Cu/Ni, Al/Ni, Au/Ni or Fe/Ni) in the form of female and male pins 1025a, 1025b and 1040a, 1040b, respectively, thus forming the SC portion of the system 1000 similar to that of system 600 of FIG. 6 or system 700 of FIG. 7.

The pin headers of FIG. 10 may provide an additional benefit, where multiple TCs are to be interconnected to a single PCB, as each pair of pins/sockets of the mating headers offering an additional opportunity to engage another TC in a compact layout. The small conductor lengths of the male and female pins also tend to minimize thermal differentials in the exemplary TC system.

FIG. 11 illustrates an exemplary TC system 1100 comprising multiple TC types, in accordance with the present invention. TC system 1100 comprises a TC portion 1110 having two or more TC types (e.g., 4 types) for example, TC1 is a type J thermocouple 1111, TC2 is a type T thermocouple 1112, TC3 is a type K thermocouple 1113, and TC4 is a type S thermocouple 1114. System 1100 further comprises a semi-compensation portion 1120 having materially similar conductor pairs 1121, for example, comprising semi-compensating conductor pairs (e.g., Au/Ni, Cu/NI, Pd/Pt) 1121 that are materially similar for all the TC types used in the system.

Each TC of the multiple TC type system 1100 is coupled to one of the materially similar conductor pairs 1121, wherein one of the conductors of each pair 1121 is composed of a material different than the thermoelectric materials of the TC portion 1110. System 1100 also comprises a cold junction compensation portion CJC 1130 using the same conductor material throughout all the conductor pairs, for example, conductor pairs 1131 all comprise one material type (e.g., Cu, Ag, Au). The CJC portion 1130 further comprises one or more thermal sensors (not shown) near the junction of the semi-compensation portion 1120 and the CJC portion conductor pairs 1131, wherein multiple semi-compensated temperature measurement outputs 1140 may be provided.

For example, FIG. 12 illustrates an exemplary TC system 1200 comprising multiple TC types, in accordance with the present invention and TC system 1100 of FIG. 11, which is similar to that of FIG. 12, and as such need not be described again in full detail except where noted. TC system 1200 also comprises a TC portion 1210 having, for example, four TC types 1210a, TC1 is a type J thermocouple 1211, TC2 is a type T thermocouple 1212, TC3 is a type K thermocouple 1213, and TC4 is a type S thermocouple 1214. Although four different TC types are illustrated in FIG. 12, any number or combination of each TC type or other such TC types may be used as desired.

System 1200 further comprises a semi-compensation portion 1220 having materially similar conductor pairs, for example, a pair of Cu and Ni conductors 1221 comprise the semi-compensating conductor pairs (e.g., Au/Ni, Cu/NI, Pd/Pt) that are materially similar for al the TC types 1210a used in the system 1200. Each TC of the multiple TC type system 1200 is coupled at junction 1222 to one of the materially similar conductor pairs 1221, wherein one of the conductors of each pair 1221 is composed of a material different than the thermoelectric materials of the TC portion 1210. In the illustration, the SC portion 1220 also exemplifies a TC male connector 1220a and TC female connector 1220b having metallic conductors, or other such conductive hardware for engaging forming a junction 1225 therebetween.

System 1200 also comprises a cold junction compensation portion CJC 1230 using the same conductor material throughout all the conductor pairs, for example, conductor pairs 1231 all comprise one material type e.g., Cu, Ag, Au). The CJC portion 1230 further comprises one or more thermal sensors (not shown) near the junction 1235 of the semi-compensation portion 1220 and the CJC portion conductor pairs 1231, wherein multiple semi-compensated temperature measurement outputs 1240 may be provided. For example, the multiple semi-compensated outputs 1240 may be coupled to a multiplexing analog to digital converter ADC 1250 for further measurement processing, output, or display. The connector configuration of FIG. 10, for example, illustrates one element of such a multiple TC type system. Connector bodies 1030 and 1045, for example, may be PCB mounted headers manufactured using any one of a variety of common semi-compensating conductor pairs (e.g., 1025a, 1025b, and 1040a, 1040b) for interconnecting the TC types to the cold junctions.

FIG. 13 illustrates another exemplary semi-compensated TC system 1300. TC system 1000 is somewhat different from the TC systems of FIGS. 9 and 10. A screw terminal strip mounted to a PC board replaces plugs and receptacles, while a screw and terminal conductors replace the male and female pin conductors. By eliminating the plug from the TC system, the screw terminal strip also benefits thee system by eliminating one junction, namely, the leadwire to plug junction (e.g., 935 of FIG. 9, or 1035 of FIG. 10). This is because the screw head presses the TC+/TC−leadwires directly into the terminal conductor, without an additional plug junction. Similar to the header configuration of FIG. 10, the terminal strip of FIG. 13 offers an in-line configuration suitable for multiple TC connections, as shown.

In one example, the semi-compensated TC system 1300 of FIG. 13 comprises a type J thermocouple TC1 1305, and a type T thermocouple TC2 1310, whose thermoelement leadwires are wired to a screw terminal trip having screw and terminal conductor pairs comprising semi-compensating conductor material combinations (e.g., Pd/Pt, Cu/Ni, Al/Ni, Au/Ni, and Fe/Ni). For example, the TC+lead wires may be retained by Au or Au plated screws 1315a and 1320a and terminal conductors 1325a and 1320a, while the TC-lead wires may be retained by Ni or Ni plated screws 1315b and 1320b and terminal conductors 1325b and 1320b to the terminal strip 1335, respectively. The terminal strip 1335 is attached with conventional screw hardware 1340 to the PCB 1345.

From this point, the terminal conductors 1325a, 1325b and 1330a, 1330b are joined to conductive traces 1350a, 1350b and 1355a, 1355b of the PCB 1345. Once the terminal conductor is joined to the PCB conductive traces, the remaining portion of the system may be described similar to that of FIGS. 9 and 10, therefore need not be described again in detail except where the systems differ. CJC temperature sensors 1360 and 1365 are located near the cold junction terminals 1370 of the TC1 type J 1305 and the TC2 type T 1310 thermocouples, respectively. PCB traces 1370a, 1370b and 1375a, 1375b attach to the CJC sensors 1360 and 1365, respectively, for external detection of the ambient temperature at the cold junctions 1370.

FIG. 14 illustrates a diagram 1400 of the exemplary semi-compensated thermocouple system 1300 of FIG. 13, using a screw terminal strip in accordance with the present invention. FIG. 14 is illustrated and may be described similar to that of the TC system 700 of FIG. 7, and as such need not be fully described again for the sake of brevity. System 1400 demonstrates that the EMF detected from type K thermocouple 405 at 100° C. 480 is conveyed over leadwires KP/KN 415a, 415b directly to a junction 1425a, 1425b at 25° C. 490, having a first material inhomogeneity 1427, to a semi-compensating conducting material combination (e.g., Cu/Ni, or Au/Ni) comprising the screws and terminal conductors 1430a, 1430b. The screws and terminal conductors 1430a, 1430b terminate into a PC board forming another junction 1435a, 1435b having a second inhomogeneity 1437 transitioning to conductive copper traces 1440a, 1440b on the PCB, wherein the temperature is determined by voltmeter 450.

The TC system 1400 of FIG. 14, for example, like the system 1300 of FIG. 13 uses a screw terminal strip comprising semi-compensating conductive material combinations in the screws and terminal conductors to compensate the cold junction of the TC system. In this exemplary system 1400, three portions exist: a TC portion 1460, a screw terminal conductor portion 1470, and a PC board CJC portion 1475.

Using the temperature differentials indicated as before, and the TC materials and conductor materials of the semi-compensated system of FIG. 14, the EMF produced in each section is as follows:

| Area | Material | Temp differential | EMF |
| --- | --- | --- | --- |
| TC Portion | K | T1 + T2 = (100 − 25)° C. = 75° C. | =3.096 mV |
| Screw TS Conductor | Cu/Ni | T3 = (25 − 20)° C. = 5° C. | =0.112 mV |
| PCB CJC Portion | CJC | T4 = (20 − 0)° C. = 20° C. | =0.798 mV |
| | | TOTAL = | =4.006 mV |

Since a type K thermocouple produces 4.006 mV due to thermal EMFs representing 97.5° C. while the actual temperature is 100° C., there is an error of only 2.5° C. produced by the semi-compensated TC system of FIG. 14 (which is the same as in FIG. 7), having at least two material inhomogeneities 1427 and 1437 after the TC measurement junction 405. The semi-compensated system 1400 is still less expensive than that of the full compensated system 400 of FIG. 4, or that of system 700 of FIG. 7, but only produces one quarter of the error of the uncompensated system 500 of FIG. 5

Although the invention has been illustrated and described with respect to one or more embodiments, implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising."

What is claimed is:

1. A set of electrical connector pins for a thermocouple comprising:
    two materially similar conductor pairs coupled with each other to form a semi-compensated portion, each conductor pair comprising conductors composed of a different material, and carried by an electrically insulating connector housing, the conductor pairs operable to engage with two thermoelement conductors that form a thermocouple of differing types, the conductor pairs coupled in series with the thermoelement conductors, and the thermocouples providing a hot junction electrical interconnection therebetween at one end and coupled to a cold junction at another end, and at least one of the conductors of the conductor pairs composing a different material than a material of the thermoelement conductors;
    wherein the semi-compensated portion is disposed between the hot junction and the cold junction and the different materials of each conductor pair are configured to generate an EMF to provide a partial compensation to the thermocouple EMF developed between the hot junction and the cold junction when engaged thereto for the different type thermocouples.

2. The set of electrical connector pins of claim 1, further comprising a temperature sensor at the cold junction for measuring a temperature of the cold junction.

3. The set of electrical connector pins of claim 2 wherein the temperature sensor is at least one of an RTD, a thermistor, a diode, a transistor, and an IC chip type sensor.

4. The set of electrical connector pins of claim 2, further comprising an electrical circuit board for mounting the conductors, the electrically insulating connector housing, and the temperature sensor at the cold junction.

5. The set of electrical connector pins of claim 1 wherein the conductors are elongated metallic conductors.

6. The set of electrical connector pins of claim 1 wherein the conductors are positioned to project from the electrically insulating connector housing.

7. The set of electrical connector pins of claim 1 wherein the materials of the two conductor pairs are each selected to develop a voltage that is associated with the thermocouple EMF developed between the hot junction and the cold junction when engaged thereto for the different type thermocouples.

8. The thermocouple system of claim 1 wherein at least one of the conductors of each conductor pair is composed of a material different than the material of the respective thermoelement conductor of the associated thermocouple.

9. An electrical connector for mating to a thermocouple comprising:
    two materially similar elongated metallic conductor pairs, each conductor pair composed of two different metals, the conductor pairs operable to engage with two other materially similar mating pairs of connector conductors to form a semi-compensated portion, each mating pair of connector conductors composed of two different materials, the two other mating pairs of connector conductors being electrically connected to two different thermocouple types providing a hot junction electrical interconnection therebetween at one end and couple to a cold junction at another end, wherein the conductor pairs are coupled in series with the other mating pairs of connector conductors, and at least one of the conductor pairs composing a different material than a material of the other mating pairs of connector conductors; and
    an electrically insulating connector housing, through which each conductor is carried by and positioned to project from the connector housing;
    wherein the semi-compensated portion is disposed between the hot junction and the cold junction and the different metals of each of the elongated metallic conductor pairs and the different metals of each of the mating pairs of connector conductors each generate an EMF to provide a partial compensation to the thermocouple EMF developed at the cold junction of the respective thermocouple when engaged thereto.

10. The electrical connector of claim 9 wherein the metals of the conductor pairs of the connector are selected to develop a voltage for compensation at the cold junction of the thermocouple that is associated with voltage developed by the respective thermocouple.

11. The electrical connector of claim 9, further comprising a temperature sensor at the cold junction for measuring a temperature of the cold junction.

12. The electrical connector of claim 11 wherein the temperature sensor is at least one of an RTD, a thermistor, a diode, a transistor, and an IC chip type sensor.

13. The electrical connector of claim 11, further comprising an electrical circuit board for mounting the conductor pairs, the electrically insulating connector housing, and the temperature sensor at the cold junction.

14. The electrical connector of claim 9 wherein each conductor of the conductor pair is an elongated metallic conductor.

15. An electrical connector for mating to a thermocouple comprising:
    two elongated metallic conductors, the conductors being materially dissimilar, the conductors operable to engage with two other materially dissimilar mating connector conductors to form a semi-compensated portion, the two other mating connector conductors being electrically connected to a thermocouple providing a hot junction and electrical interconnection therebetween at one end and to couple to a cold junction at another end, wherein the conductors are coupled in series with the other mating connector conductors, and the conductors being materially similar to the other mating connector conductors, the semi-compensated portion disposed between the hot junction and the cold junction; and
    an electrically insulating connector housing, through which each conductor is carried by and positioned to project from the connector housing;
    wherein the different metals of the elongated metallic conductors and the different materials of the mating connector conductors each generate an EMF to provide a partial compensation to the thermocouple EMF developed at the cold junction of the thermocouple when engaged thereto.

16. The electrical connector of claim 15 wherein the materials of the conductors of the connector are selected to develop a voltage for compensation at the cold junction of the thermocouple that is associated with voltage developed by the thermocouple.

17. The electrical connector of claim 15 wherein one of the elongated metallic conductors, and the mating connector conductors comprise a pair of male and female electrical pins for electrically interconnecting and engaging therebetween.

18. The electrical connector of claim 15 wherein the conductors coupled to the hot junction end comprise male electrical pins, and the conductors coupled to the cold junction end comprise female electrical pins, wherein electrical and mechanical engagement and alignment are provided therebetween.

19. The electrical connector of claim 15 wherein the conductors coupled to the hot junction end comprise female electrical pins, and the conductors coupled to the cold junction end comprise male electrical pins, wherein electrical and mechanical engagement and alignment are provided therebetween.

20. The electrical connector of claim 15, further comprising a temperature sensor at the cold junction for measuring a temperature of the cold junction.

\* \* \* \* \*